US012768985B2

(12) United States Patent
Case

(10) Patent No.: US 12,768,985 B2
(45) Date of Patent: Oct. 20, 2026

(54) THREE DIMENSIONAL (3D) NONUNIFORM FREEHAND SCANNING

(71) Applicant: The Aerospace Corporation, El Segundo, CA (US)

(72) Inventor: Joseph Tobias Case, Hawthorne, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 314 days.

(21) Appl. No.: 18/482,272

(22) Filed: Oct. 6, 2023

(65) Prior Publication Data

US 2025/0116771 A1 Apr. 10, 2025

(51) Int. Cl.
*G01S 13/90* (2006.01)
*G01N 29/06* (2006.01)
*G01N 29/265* (2006.01)

(52) U.S. Cl.
CPC ........ *G01S 13/9019* (2019.05); *G01N 29/069* (2013.01); *G01N 29/265* (2013.01)

(58) Field of Classification Search
CPC .................................................... G01N 29/069
See application file for complete search history.

(56) References Cited

U.S. PATENT DOCUMENTS 9,316,734 B2 4/2016 Case et al.
2014/0111374 A1* 4/2014 Case .................. G01S 13/9011 342/25 F
2018/0106765 A1* 4/2018 Kim .................... G01N 29/043

OTHER PUBLICATIONS

L. J. Busse, Three-Dimensional Imaging Using a Frequency-Domain Synthetic Aperture Focusing Technique, 1992, IEEE, IEEE Transactions on Ultrasonics, Ferroelectrics, and Frequency Control, vol. 39. No. 2, pp. 174-179 ( Year: 1992).*

* cited by examiner

*Primary Examiner* — Vladimir Magloire
*Assistant Examiner* — Eric K Hodac
(74) *Attorney, Agent, or Firm* — LeonardPatel PC

(57) ABSTRACT

Performing freehand scanning imaging includes transforming a single spatial location with nonuniform input data using NDFT for one spatial location to a singular spectral estimation. Performing freehand scanning imaging also includes translating the singular spectral estimation to $z_l$, wherein $z_l$ is a common value of z for which to later recombine data for layer l, and where l begins at zero. Performing freehand scanning imaging further includes performing Inverse Spatial Fourier Transform on the translated spectrum to produce a translated data in a x- and y-spatial domain at $z=z_l$. Performing freehand scanning imaging also includes outputting 3D translated data to an N-dimensional regularization from all measured locations, where all measured locations are regularized data resulting from a combined sum of all measured contributions, and outputting the regularized data to a SAFT algorithm to produce images layer-by-layer, whereby the process is repeated for subsequent layers layer-by-layer.

24 Claims, 12 Drawing Sheets

100

100

200

300

400

700

800

1100

THREE DIMENSIONAL (3D) NONUNIFORM FREEHAND SCANNING

FIELD

The present invention relates to freehand scan imaging, and more particularly, to performing freehand scan imaging when hovering in space or when inspecting from a rough or angled surface.

BACKGROUND

Freehand scanning with imaging is valuable to the non-destructive evaluation (NDE) community for in situ measurement, particularly for ultrasonic testing (UT) and microwave testing (MW). Freehand scanning is when a UT transducer or MW probe nonuniformly scans over an area of interest to form an image relevant to inspection criteria. It may be performed by hand or using robotics, with the key feature being the nonuniform concentration of spatial sampling, which must be regularized. To reduce nomenclature, the term 'probe' will be used instead of both UT transducer and MW probe.

State-of-the-art algorithms still rely upon data taken in a flat two-dimensional (2D) space. It is very difficult, maybe even impossible, to perform scanning by hand in midair and constrain oneself to a planar surface. Moreover, parts under test may require probe angles non-normal to the scan plane. In these instances, data must be considered as being non-uniformly sampled in a three-dimensional (3D) space with roll, pitch, and yaw (RPY), which must be regularized.

SAFT from 2D Nonuniform Measurements

Imaging techniques considered here are synthetic aperture focusing techniques (SAFT) and synthetic aperture radar (SAR), which provide high resolution images when applied to UT and MW, respectively. To reduce nomenclature, the term SAFT will be used for both SAFT and SAR. SAFT is useful for coherent traveling waves. SAFT for a planar surface is already well known, so only a primer will be described here. Since time-based data can be transformed to the frequency-domain, only frequency-domain data is considered. In this text, complex valued coherent data (for example, reflection coefficient) will be represented as $d_n(\bar{x}_n, \bar{y}_n, \bar{f})$ for sample index n, where $(\bar{x}_n, \bar{y}_n)$ is spatially non-uniformly sampled and $(\bar{f})$ is an array of uniformly or nonuniformly sampled frequency. The convention in this document is to use the overbar to convey potentially non-uniform sampling, which may be the result of handheld measurements. The convention is also followed that symbols with subindices are single valued except as defined in the nomenclature. It is assumed that the data is taken at a particular liftoff $z=z_0$, as shown in FIG. 1 where a view is provided tangential to the measurement plane to easily see symmetry. FIG. 1 is related art of graph 100 illustrating a conventional measurement setup with flat measurement plane and flat layers. All subsequent figures illustrating the scan are similar only different to this for ease of interpretation of how symmetry may be steadily broken.

SAFT techniques are broken down into two key steps—spectral estimation and image formation. FIG. 2 is related art of a flow diagram 200 illustrating spectral estimation from nonuniformly spatially sampled data. In FIG. 2, spectral estimation with spatially nonuniform input data 205 requires the aggregation of numeric weight 210 (Algorithm 1 Line 5) and the aggregation of signal 215 (Algorithm 1 Line 4) prior to normalizing the aggregated signal by the aggregated weight to produce regularized data for layer 0 or $r_0(x, y, \bar{f})$ 220 (Algorithm 1 Line 6). At 225, the final step of spectral estimation is to perform the spatial two-dimensional fast Fourier transform (FFT) resulting in $R_0(k_x, k_y, \bar{f})$, where $(k_x, k_y)$ represents uniformly sampled spatial frequency domain along x and y (Algorithm 1 Line 7).

Algorithm 1. Spectral Decomposition from 2D Nonuniformity Sampled Data ($SD_{XY}$).

| Mathematical Operation | (Line) Description |
|---|---|
| $a(x, y, \bar{f}) = 0$ | (1) Initialize aggregation of data array to zero for uniform x and y |
| $w(x, y) = 0$ | (2) Initialize aggregation of weight array to zero for uniform x and y |
| For $n = 0, 1, \cdots (N-1)$ | (3) Sample index n for N nonuniform points |
| $a(x, y, \bar{f}) += d_n(\bar{x}_n, \bar{y}_n, \bar{f}) \cdot b(x-\bar{x}_n, y-\bar{y}_n)$ | (4) Aggregate (similar to convolution) data weighted with brush b and store in a |
| $w(x, y) += b(x-\bar{x}_n, y-\bar{y}_n)$ | (5) Aggregate brush alone and store in w |
| $r_0(x, y, \bar{f}) = \begin{cases} a(x, y, \bar{f})/w(x, y) & w(x, y) > tol \\ 0 & \text{otherwise} \end{cases}$ | (6) Regularize aggregated data with weight for weight greater than some tolerance |
| $R_0(k_x, k_y, \bar{f}) = FFT_{XY}\{r_0(x, y, \bar{f})\}$ | (7) Compute spectrum along x and y for layer 0 |

FIG. 3 is related art of a flow diagram 300 illustrating a typical SAFT with nonuniformly spatially sampled data. In FIG. 3, image formation begins with enforcing the dispersion relation to relate $\bar{f}$ to $\overline{k_z}$, , where $\overline{k_z}$ is nonuniformly sampled spatial frequency along z (Algorithm 2 Line 3). Consequently, $R_0(k_x, k_y, \bar{f})$ is transformed into $R_0(k_x, k_y, \overline{k_{z0}})$. The well-known nonuniform discrete Fourier transform (NDFT) or the nonuniform fast Fourier transform (NUFFT) may then be used inversely along z to determine an intermediate 2D spectrum of the partial image $$S(k_x, k_y, z)|_{z=z_0}^{z=z_1}$$

for layer 0. Using the piece-wise process described in prior art for laminar materials, the spectrum $R_0(k_x, k_y, \overline{k_{z0}})$ may be translated to the next layer using:

$$R_{l+1}(k_x, k_y, \bar{f}) = R_l(k_x, k_y, \bar{f})\cdot\exp(-j(z_{l+1}-z_l)\cdot\overline{k_{zl}}(\bar{f})) \qquad \text{Eq. (1)}$$

for l=0 (Algorithm 2 Line 6). The process may be repeated through subsequent layers to complete $S(k_x, k_y, z)$. Finally, the output volume image s(x, y, z) is obtained by performing the inverse 2D FFT along x and y for $S(k_x, k_y, z)$ (Algorithm 2 Line 7). The output image contains important information regarding the structure under test and is in focus for all layers.

TABLE 1-continued

Nomenclature for 2D Nonuniform Measurements

| Symbol | Description |
|---|---|
| $a(x, y, \bar{f})$ | 3D array of aggregated signal data |
| $w(x, y)$ | 2D array of aggregated weight |
| $b(x, y)$ | 2D function to represent a brush |
| $r_l(x, y, \bar{f})$ | 3D array of regularized data at layer l |
| $R_l(k_x, k_y, \bar{f}) = R_l(k_x, k_y, \overline{k_{z_l}}(\bar{f}))$ | 3D array of spectrum of regularized data at layer l |

Algorithm 2. Piece-wise SAFT image formation from nonuniformly spatially sampled data (SAFT-PW).

| Mathematical Operation | (Line) Description |
|---|---|
| $R_0(k_x, k_y, \bar{f}) = SD_{XY}\{d_n(\bar{x}_n, \bar{y}_n, \bar{f})\forall n\}$ | (1) Compute spectrum |
| For l = 0, 1, . . . (L − 1) | (2) Layer index l for L layers |
| $\overline{k_{zl}}(\bar{f}) = \sqrt{\left(\frac{4\pi\bar{f}}{c_l}\right)^2 - k_x^2 - k_y^2}$ | (3) Dispersion relation for phase velocity $c_l$ for layer l |
| $R_l(k_x, k_y, \overline{k_{z_l}}(\bar{f})) \leftarrow R_l(k_x, k_y, \bar{f})$ | (4) Enforce dispersion relation |
| $S(k_x, k_y, z)\vert_{z=z_l}^{z=z_{l+1}} = NDFT_z^{-1}\{R_l(k_x, k_y, \overline{k_{z_l}}[(\bar{f}))\}$ | (5) Intermediate image spectrum valid for range along z for layer l |
| $R_{l+1}(k_x, k_y, \bar{f}) = R_l([k_x, k_y, \bar{f})\cdot\exp(-j(z_{l+1}-z_l)\cdot\overline{k_{z_l}}[(\bar{f}))$ | (6) Translate spectrum to next layer |
| $s(x, y, z) = FFT_{XY}^{-1}\{S(k_x, k_y, z)\}$ | (7) Compute final image |

TABLE 1

Nomenclature for 2D Nonuniform Measurements

| Symbol | Description |
|---|---|
| n | Spatial sample index |
| l | Layer index |
| $c_l$ | Phase velocity in layer l |
| x | 1D array of uniformly sampled x |
| $\bar{x}_n$ | Nonuniformly sampled position along the x direction at sample index n |
| $k_x$ | 1D array of uniformly sampled spatial frequency along x |
| y | 1D Array of uniformly sampled y |
| $\bar{y}_n$ | Nonuniformly sampled position along the y direction at sample index n |
| $k_y$ | 1D array of uniformly sampled spatial frequency along y |
| $z_l$ | Top of layer along z for layer l |
| $\overline{k_{z_l}}$ | 1D array of nonuniformly sampled spatial frequency along z. Related to frequency by the dispersion relation |
| $\bar{f}$ | 1D Array of uniformly or nonuniformly sampled frequency |
| $d_n(\bar{x}_n, \bar{y}_n, \bar{f})$ | Coherent, complex-valued 1D signal array for sample index n for 2D nonuniform measurements. Number of elements equals the number of elements of $\bar{f}$. |

TABLE 1-continued

Nomenclature for 2D Nonuniform Measurements

| Symbol | Description |
|---|---|
| $S(k_x, k_y, z)$ | 3D array of intermediate image spectrum |
| $s(x, y, z)$ | 3D array of volume image |

However, flow diagram 300 of FIG. 3 is limited in so far that the original spatial nonuniformity of measurement is constrained to x and y. This does not support imaging for curved surfaces or from measurements from point clouds with nonuniform roll, pitch, and yaw. The next section describes how to remove this restriction.

Thus, an improved imaging technique described below may be needed.

SUMMARY

Certain embodiments of the present invention may provide solutions to the problems and needs in the art that have not yet been fully identified, appreciated, or solved by current image scanning technologies. More specifically, some embodiments of the present invention pertain to performing freehand scan imaging. For example, the improved imaging technique provides for truly freehand scanning with N degree-of-freedom regularization, where N is typically from 2 (x and y) to 6 (x, y, z, roll, pitch, yaw). In short, the technique makes it possible from hovering a probe over a specimen under test or moving over an irregular surface. Additionally, the technique is performed with real-time image update or post-processed aggregation.

In one embodiment, a method for performing freehand scanning includes transforming a single spatial location with nonuniform input data using Nonuniform Discrete Fourier Transform (NDFT) for one spatial location to a singular spectral estimation. The method also includes translating the singular spectral estimation to $z_l$, wherein $z_l$ is a common value of z for which to later recombine data for layer l, where l begins at zero. The method further includes performing Inverse Spatial Fourier Transform on the translated spectrum to produce a translated data in a x- and y-spatial domain at $z=z_l$. The method also includes outputting three dimension (3D) translated data to an N-dimensional regularization from all measured locations, where all measured locations are regularized data resulting from a combined sum of all measured contributions, and outputting the regularized data to a SAFT algorithm to produce images layer-by-layer, whereby the process is repeated, by the at least one processor, for subsequent layers layer-by-layer.

In another embodiment, a computer program embodied on a non-transitory computer-readable medium for performing freehand scanning imaging. The computer program is configured to cause at least one processor to execute transforming a single spatial location with nonuniform input data using Nonuniform Discrete Fourier Transform (NDFT) for one spatial location to a singular spectral estimation, and translating the singular spectral estimation to $z_l$, wherein $z_l$ is a common value of z for which to later recombine data for layer l, where l begins at zero. The computer program is configured to cause at least one processor to execute performing Inverse Spatial Fourier Transform on the translated spectrum to produce a translated data in a x- and y-spatial domain at $z=z_l$. The computer program is configured to cause at least one processor to execute outputting three dimension (3D) translated data to an N-dimensional regularization from all measured locations, where all measured locations are regularized data resulting from a combined sum of all measured contributions. The computer program is configured to cause at least one processor to execute outputting the regularized data to a SAFT algorithm to produce images layer-by-layer, whereby the process is repeated, by the at least one processor, for subsequent layers layer-by-layer.

In yet another embodiment, a system for performing freehand scanning imaging includes memory comprising a set of instructions, and at least one processor. The set of instructions is configured to cause at least one processor to execute transforming a single spatial location with nonuniform input data using Nonuniform Discrete Fourier Transform (NDFT) for one spatial location to a singular spectral estimation, and translating the singular spectral estimation to $z_l$, wherein $z_l$ is a common value of z for which to later recombine data for layer l, where l begins at zero. The set of instructions is configured to cause at least one processor to execute performing Inverse Spatial Fourier Transform on the translated spectrum to produce a translated data in a x- and y-spatial domain at $z=z_l$. The set of instructions is configured to cause at least one processor to execute outputting three dimension (3D) translated data to an N-dimensional regularization from all measured locations, where all measured locations are regularized data resulting from a combined sum of all measured contributions. The set of instructions is configured to cause at least one processor to execute outputting the regularized data to a SAFT algorithm to produce images layer-by-layer, whereby the process is repeated, by the at least one processor, for subsequent layers layer-by-layer.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
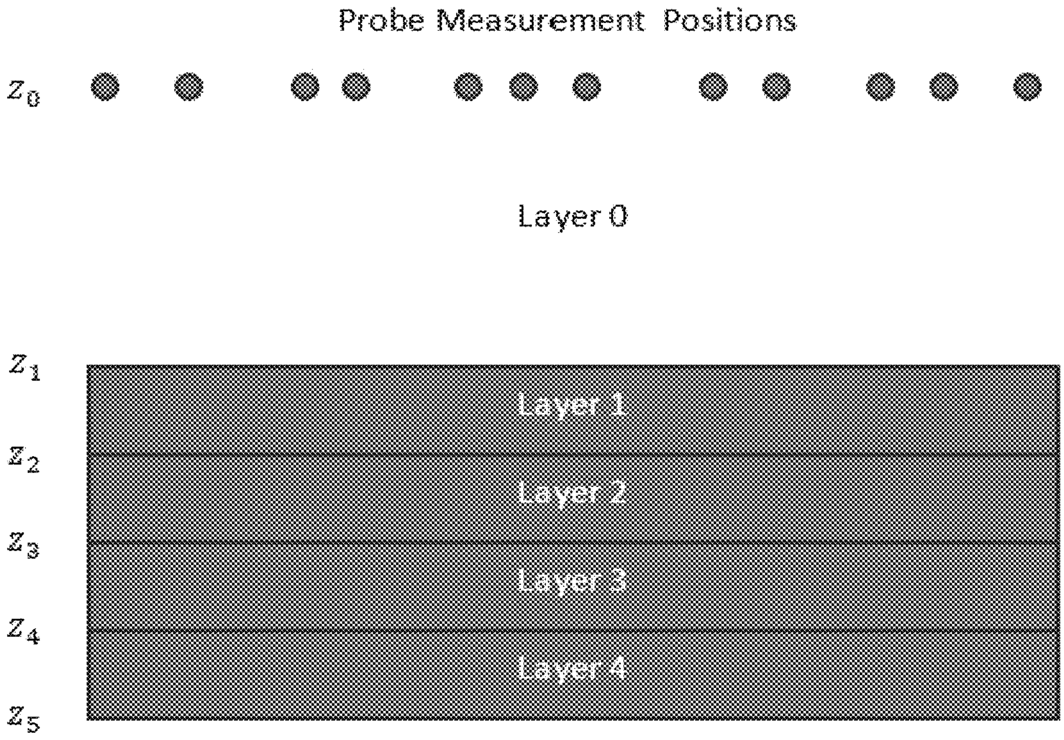
FIG. 1 is related art of graph illustrating a conventional measurement setup with flat measurement plane and flat layers.
Figure 2:
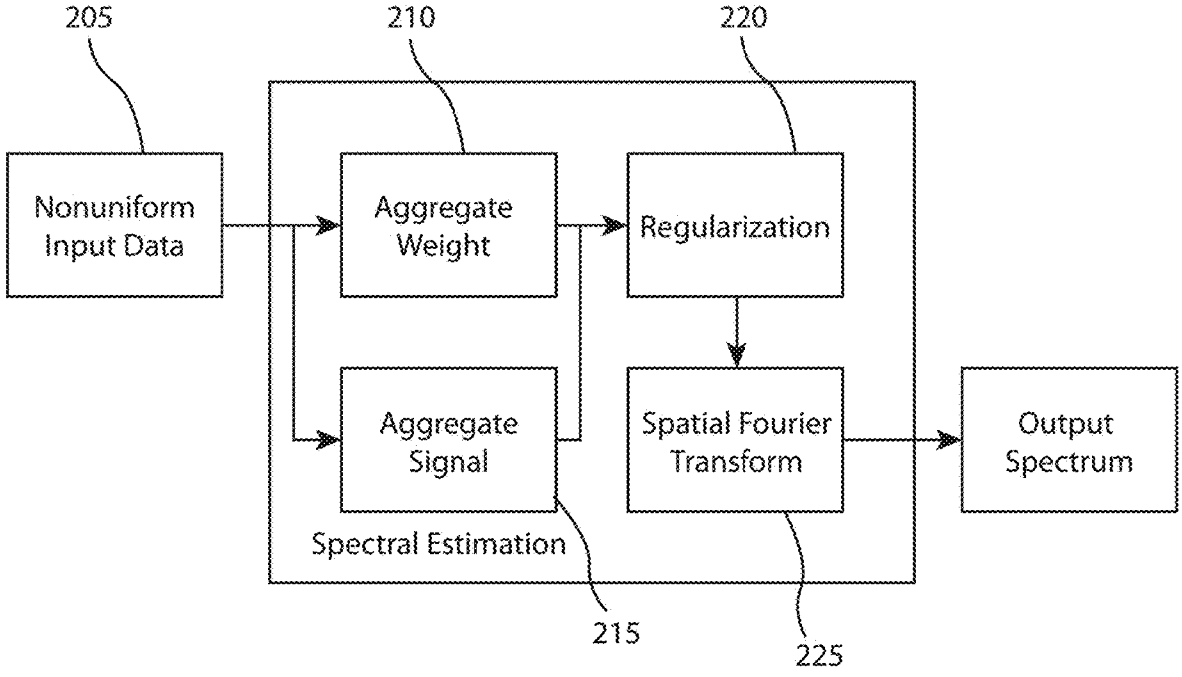
FIG. 2 is related art of a flow diagram illustrating spectral estimation from nonuniformly spatially sampled data.
Figure 3:
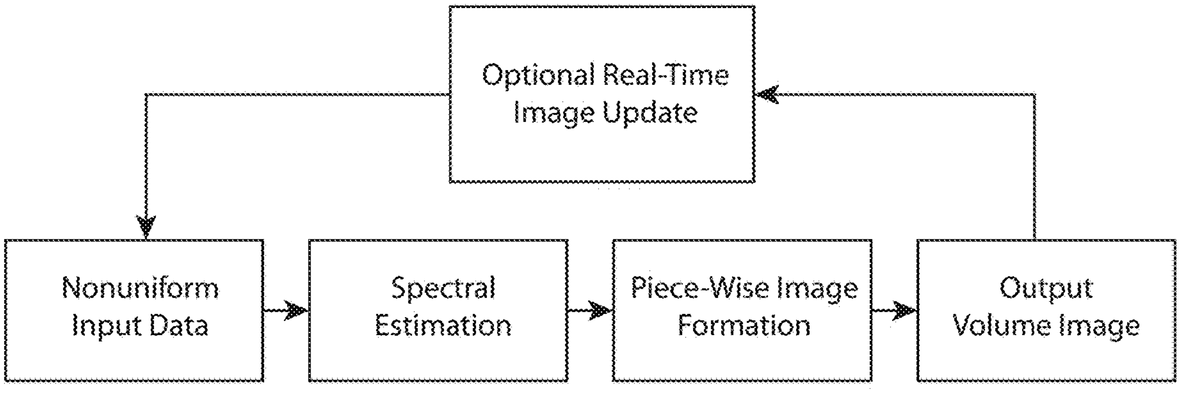
FIG. 3 is related art of a flow diagram illustrating a typical SAFT with nonuniformly spatially sampled data.

Some embodiments generally pertain to freehand scanning with imaging. For example, freehand scanning with imaging enables inspections with high-resolution real-time 3D image update from N degree-of-freedom positioning and regularization, where N could include x, y, z, roll, pitch, yaw, etc. This work enables freehand scans with high-resolution synthetic focusing from surfaces with changing thickness, hand-held free-space measurements, or normal and oblique recombination of measurements. The result is a high-resolution 3D image with minimal image artifacts, which is possible with coherent measurements. Freehand scanning with imaging provides the inspector with vital information to quantify the structure or material properties nondestructively. Unlike the current state of the art that requires data to be taken in a flat plane, the freehand scanning technique described herein removes this restriction and allows for the highest 3D image quality from N degree-of-freedom freehand measurements. Furthermore, freehand scanning technique not only enables synthetic focusing from a curved surface into a structure with flat interfaces, but also enables synthetic focusing through multiple curved interfaces.

Below is Table 2 that includes nomenclature for 3D nonuniform measurements.

TABLE 2

Nomenclature for 3D Nonuniform Measurements

| Symbol | Description |
|---|---|
| n | Spatial sample index |
| l | Layer index |
| $c_l$ | Phase velocity in layer l |
| x | 1D array of uniformly sampled x |
| $\bar{x}_n$ | Nonuniformly sampled position along the x direction at sample index n |
| $k_x$ | 1D array of uniformly sampled spatial frequency along x |
| y | 1D Array of uniformly sampled y |
| $\bar{y}_n$ | Nonuniformly sampled position along the y direction at sample index n |
| $k_y$ | 1D array of uniformly sampled spatial frequency along y |
| $\bar{z}_n$ | Nonuniformly sampled position along the z direction at sample index n |
| $\underline{z}_l$ | Top of layer along z for layer l |
| $\bar{k}_{z_l}$ | 1D array of nonuniformly sampled spatial frequency along z. Related to frequency by the dispersion relation |
| $\bar{f}$ | 1D Array of uniformly or nonuniformly sampled frequency |
| $d_n(\bar{x}_n, \bar{y}_n, \bar{z}_n, \bar{f})$ | Coherent, complex-valued 1D signal array for sample index n for 3D nonuniform measurements. Number of elements equals the number of elements of $\bar{f}$. |
| $D_n(k_x, k_y, \bar{z}_n, \bar{f})$ | 3D array storing the spectrum of $d_n(\bar{x}_n, \bar{y}_n, \bar{z}_n, \bar{f})$ for sample index n |
| $T_n(k_x, k_y, \bar{z}_n, \bar{f})$ | 3D array storing the translated $D_n(k_x, k_y, \bar{z}_n, \bar{f})$ to a singular value of $z_l$, which is a temporary variable |
| $t_n(x, y, \bar{z}_n, \bar{f})$ | 3D array storing the uniformly sampled translated signal data |
| $a(x, y, z, \bar{f})$ | 4D array of aggregated signal data |
| w(x, y, z) | 3D array of aggregated weight |
| b(x, y, z) | 3D function to represent a brush |
| $r_l(x, y, \bar{f})$ | 3D array of regularized data at layer l |
| $R_l(k_x, k_y, \bar{f}) = R_l(k_x, k_y, \bar{k}_{z_l}(\bar{f}))$ | 3D array of spectrum of regularized data at layer l |

TABLE 2-continued

Nomenclature for 3D Nonuniform Measurements

| Symbol | Description |
|---|---|
| $h_l(x, y)$ | Function representing top surface profile of layer l |
| $V_l(k_x, k_y, z, \bar{f})$ | 4D array of intermediate image spectrum at layer l valid for the range of z according to the surface profile |
| $v_l(x, y, z, \bar{f})$ | 4D array of the inverse 2D FFT of $v_l(k_x, k_y, z, \bar{f})$ at layer l |
| $q_n(\bar{x}_n, \bar{y}_n, \bar{z}_n, \bar{f})$ | Sampled intermediate data translated to the interface, a temporary loop value |
| $S_l(k_x, k_y, z)$ | 3D array of intermediate image spectrum at layer l |
| $s_l(x, y, z)$ | 3D array of volume image at layer l |

SAFT from 3D Nonuniform Measurements

Figure 4:
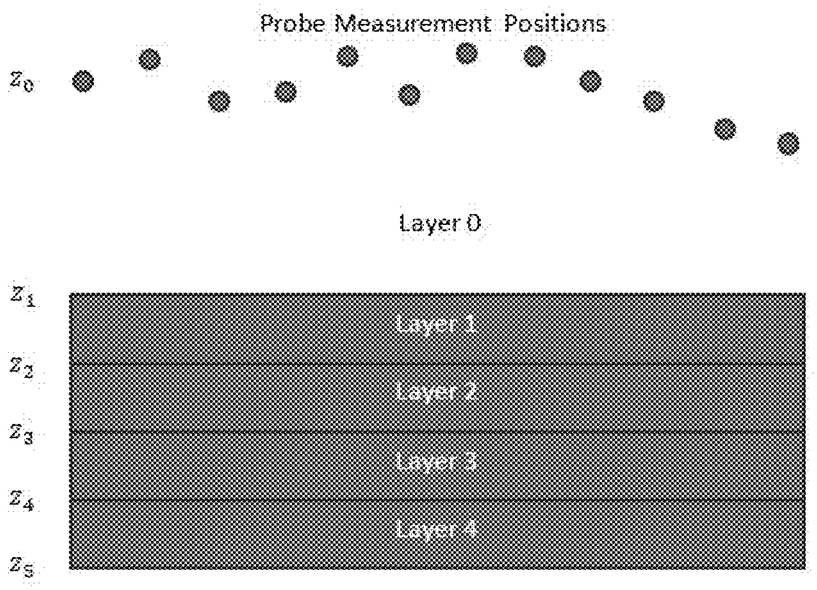
FIG. 4 is a graph illustrating nonuniform z near the plane $z=z_0$ with flat buried layers, according to an embodiment of the present invention.

In some embodiments, it is no longer assumed that the data is taken at one particular $z_0$, instead it is assumed that the data is distributed in nonuniform z or $d_n(\bar{x}_n, \bar{y}_n, \bar{z}_n, \bar{f})$. See, for example, FIG. 4, which is a graph 400 illustrating nonuniform z near the plane $z=z_0$ with flat buried layers, according to an embodiment of the present invention. In this embodiment, the data may also be nonuniformly sampled in roll, pitch, and yaw; however, these terms are dropped to simplify the math to nonuniformly sampled x, y, and z for illustration purposes. The desire is to translate the information in such a way as to be inputted into the same SAFT process as described before.

To be used for imaging, the data is translated onto a common $z_0$, which is a known distance that could be down-range or up-range from the probe locations. This translation correction must be applied for every spatially sampled location in $(\bar{x}_n, \bar{y}_n, \bar{z}_n)$. See, for example, FIG. 5, which is a flow diagram 500 illustrating 3D translation using the Nonuniform Discrete Fourier Transform (NDFT) and phase shifts, according to an embodiment of the present invention.

In this embodiment, a single spatial location index (n) with data $d_n(\bar{x}_n, \bar{y}_n, \bar{z}_n, \bar{f})$ is transformed using the NDFT for one spatial location to $D_n(\bar{x}_n, \bar{y}_n, \bar{z}_n, \bar{f})$ at 505, such that $D_n$ represents the spectral estimation of $d_n(\bar{x}_n, \bar{y}_n, \bar{z}_n, \bar{f})$ before translating along z. This spectrum is then translated at 510 to $z_0$ using:

$$T_n(k_x, k_y, \bar{z}_n, \bar{f}) = D_n(k_x, k_y, \bar{z}_n, \bar{f})\exp\left(-j(z_0 - \bar{z}_n)\sqrt{k_{z_0}^2(\bar{f}) - k_x^2 - k_y^2}\right) \quad \text{Eq. (2)}$$

where $T_n$ is the translated data in the spectral frequency domain at $z=z_0$. See Algorithm 3, Line 6.

At 515, the transformed data is cast back into space using the inverse 2D FFT to produce $t_n(x, y, \bar{z}_n, \bar{f})$, where $t_n$ is the translated data in the (x, y) spatial domain at $z=z_0$. See Algorithm 3, Line 7. Aggregation for normalization may be applied in a higher dimensional space, which is shown as z but may also include roll, pitch, and yaw. See Algorithm 3, Lines 8 and 9. Finally, after all samples are processed the regularized aggregated data and spectral decomposition may be determined similar to before after summing over z. See Algorithm 3, Lines 10 and 11. The regularization problem may be simplified to not include z if desired. The 3D translated data is outputted at 520.

Algorithm 3. Spectral Decomposition from 3D Nonuniformly Sampled Data ($SD_{XYZ}$) using $c_0$ as phase velocity.

| Mathematical Operation | (Line) Description |
|---|---|
| $a(x, y, z, \bar{f}) = 0$ | (1) Initialize aggregation of data to zero |
| $w(x, y, z) = 0$ | (2) Initialize aggregation of weight to zero |
| For $n = 0, 1, \ldots (N - 1)$ | (3) Sample index n for N nonuniform points |
| $D_n(k_x, k_y, \bar{z}_n, \bar{f}) = d_n(\bar{x}_n, \bar{y}_n, \bar{z}_n, \bar{f}) \cdot \exp(-j(\bar{x}_n k_x + \bar{y}_n k_y))$ | (4) Perform singular spectral estimation. Equivalent to NDFT from one input point. |
| $\bar{k}_{z0}(\bar{f}) = \sqrt{\left(\frac{4\pi\bar{f}}{c_0}\right)^2 - k_x^2 - k_y^2}$ | (5) Dispersion relation for phase velocity $c_0$ |
| $T_n(k_x, k_y, \bar{z}_n, \bar{f}) = D_n(k_x, k_y, \bar{z}_n, \bar{f}) \cdot \exp\left(-j(z_0 - \bar{z}_n)\sqrt{\bar{k}_{z0}^2(\bar{f}) - k_x^2 - k_y^2}\right)$ | (6) Translate to $z_0$ |
| $t_n(x, y, \bar{z}_n, \bar{f}) = FFT_{XY}^{-1}\{T_n(k_x, k_y, \bar{z}_n, \bar{f})\}$ | (7) Transform back to space |
| $a(x, y, z, \bar{f}) += t_n(x, y, \bar{z}_n, \bar{f}) \cdot b(x - \bar{x}_n, y - \bar{y}_n, z - \bar{z}_n)$ | (8) Aggregate (similar to convolution) data with brush and store in a |
| $w(x, y, z) += b(x - \bar{x}_n, y - \bar{y}_n, z - \bar{z}_n)$ | (9) Aggregate brush alone and store in W |
| $r_0(x, y, \bar{f}) = \begin{cases} \sum_z a(x, y, z, \bar{f})/w(x, y, z) & \sum_z w(x, y, z) > tol \\ 0 & \text{otherwise} \end{cases}$ | (10) Regularize aggregated data with weight for weight greater than some tolerance |
| $R_0(k_x, k_y, \bar{f}) = FFT_{XY}\{r_0(x, y, \bar{f})\}$ | (11) Compute spectrum along x and y |

This 3D translated data may then be inputted into the same SAFT process as described before. See, for example, FIG. 6, which is a flow diagram 600 illustrating SAFT from 3D nonuniform measurements, according to an embodiment of the present invention. Steps 605 (nonuniform input data) and 610 (3D translation) are discussed above with respect to FIG. 5. In this embodiment, output from 610 may be fed into spectral estimation step at 615. The spectral estimation step includes a 2D Fourier transform along the x and y spatial dimensions. From 615, output image at 625 may be performed piecewise in 620 similar to prior art to form images in laminar materials, and it contains important information regarding the structure under test from all layers. Nonuniform data may be used to form intermediate output images in 625 in real-time. To this end 630 is shown to show the loop control returning to additional nonuniform input data in 605.

Figure 7:
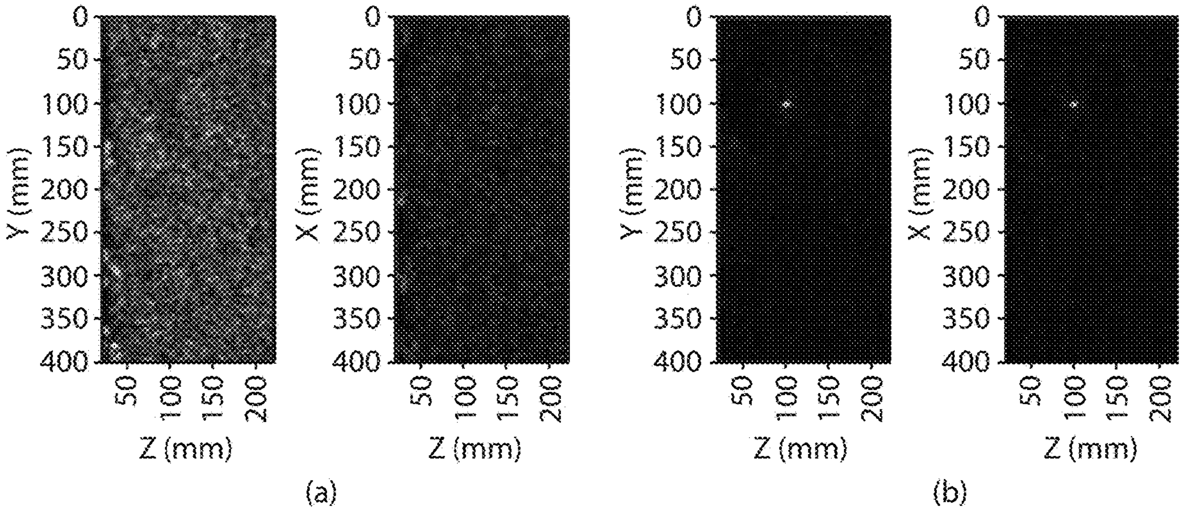
FIG. 7 is an illustration of an image (a), which is a simulation of SAFT from uncorrected data, and image (b), which is SAFT from corrected data along z, according to an embodiment of the present invention.

As an example, simulated data with a point target in air is provided with square domain of 400 mm×400 mm with a frequency sweep of 20 GHz to 40 GHz (11 frequency samples). The space is sampled 1000 times with uniform random distribution in space and range. The range varies uniformly from 50 mm to 10 mm. The point target is located at x=y=z=100 mm. Without range correction, the slices of the volume image corresponding to the point target location are just noise. See, for example, FIG. 7 showings images (a) and images (b), according to an embodiment of the present invention. In FIG. 7, image (a) is a simulation of SAFT from uncorrected data and image (b) is SAFT from corrected data along z. As can be seen, image (b) is a much clearer image than image (a).

SAFT from 3D Nonuniform Measurements and Curved Interfaces

Figure 8:
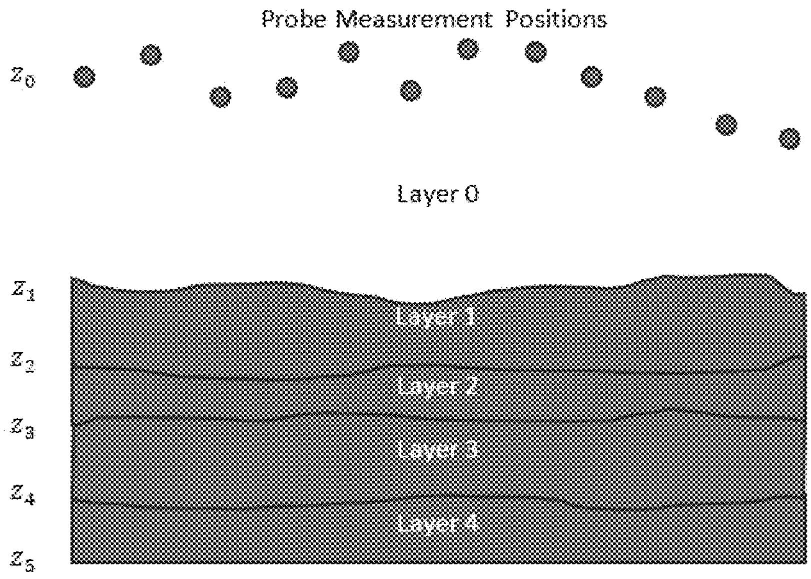
FIG. 8 is a diagram illustrating nonuniform measurements and curved subsequent layers, according to an embodiment of the present invention.

Given the discussion of recombining from nonuniform z measurements above, the same or similar process may be used if the top layer is curved or subsequent layer interfaces are curved. See, for example, FIG. 8, which is a diagram 800 illustrating nonuniform measurements and curved subsequent layers. The curved top profile of layer l may be expressed by the function $h_l(x, y)$.

Figure 5:
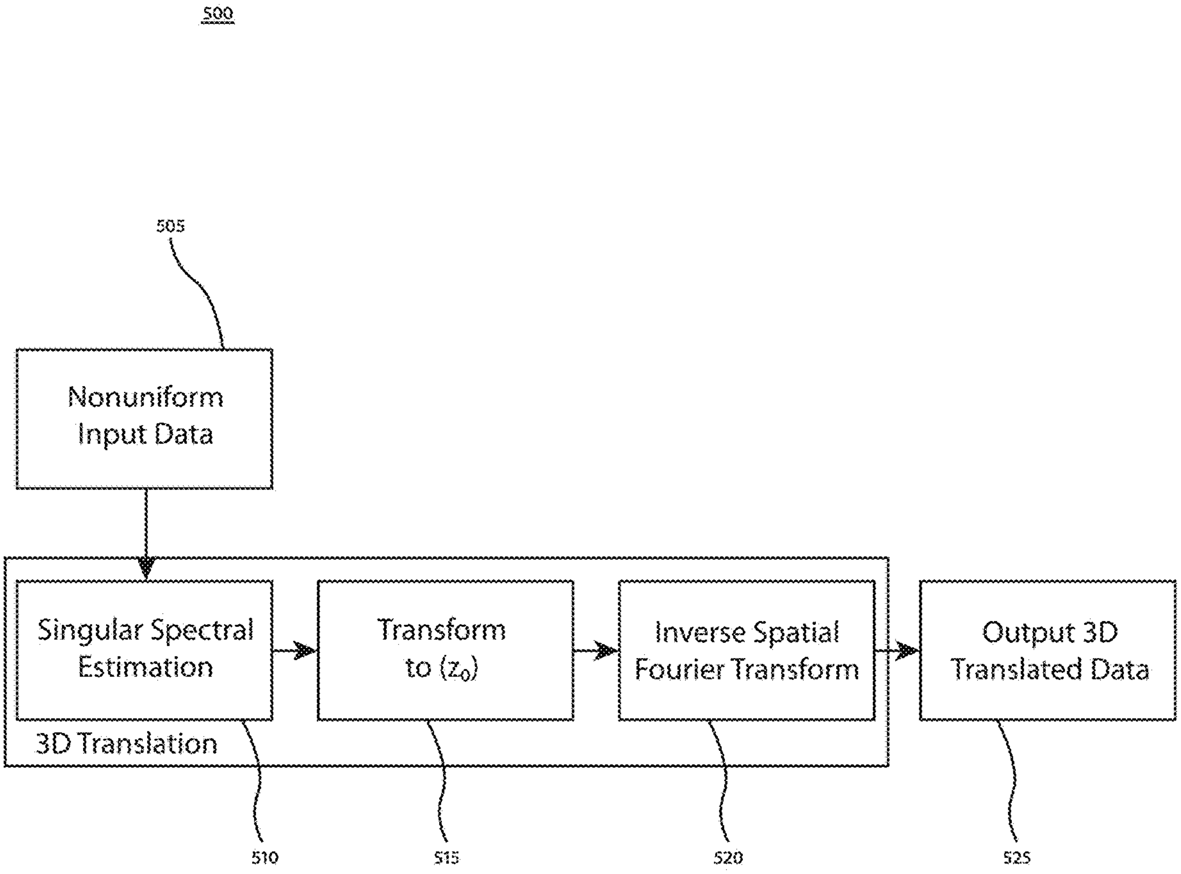
FIG. 5 is a flow diagram illustrating 3D translation using the Nonuniform Discrete Fourier Transform (NDFT) and phase shifts, according to an embodiment of the present invention.
Figure 6:
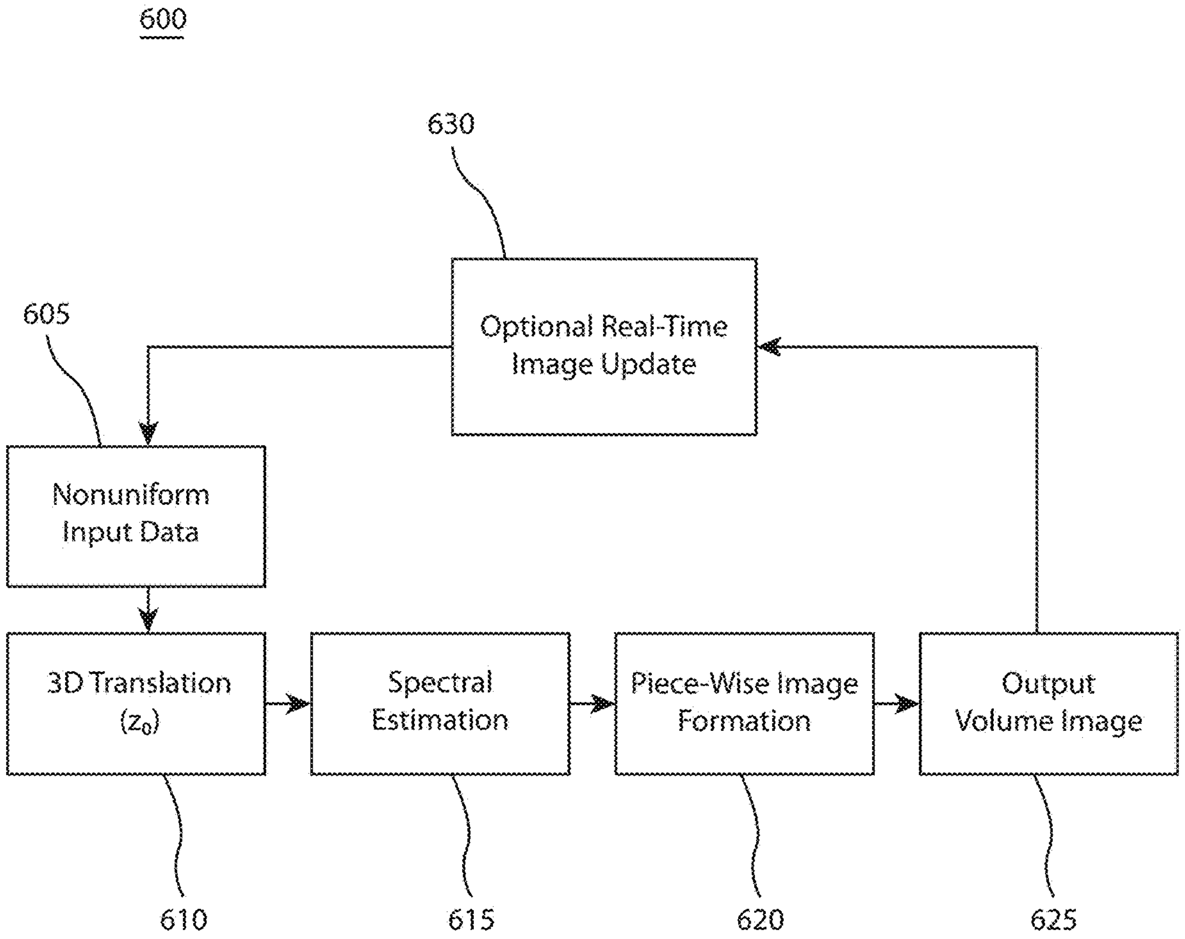
FIG. 6 which is a flow diagram illustrating SAFT from 3D nonuniform measurements, according to an embodiment of the present invention.

To form the volume image, the translation process outlined in FIG. 5 must be applied for every curved interface. temporary value which is why a layer subscript is dropped. See Algorithm 4, Line 12. Subsequent images for each deeper layer may be performed sequentially and merged to form the final image. See Algorithm 4, Line 14.

Algorithm 4. SAFT from 3D nonuniform measurements and curved interfaces.

| Mathematical Operation | (Line) Description |
|---|---|
| $R_0(k_x, k_y, \bar{f}) = SD_{XYZ}\{d_n(\bar{x}_n, \bar{y}_n, \bar{z}_n)\forall n, v_0\}$ | (1) Compute Spectrum using phase velocity $v_0$ |
| For every $l = 0, 1, \ldots (L-1)$ | (2) Layer index l |
| $\overline{k_{z}}_l(\bar{f}) = \sqrt{\left(\frac{4\pi \bar{f}}{c_l}\right)^2 - k_x^2 - k_y^2}$ | (3) Dispersion relation for phase velocity $c_l$ for layer l |
| $R_l(k_x, k_y, \overline{k_{z_l}}[(\bar{f})) \leftarrow R_l(k_x, k_y, \bar{f})$ | (4) Enforce dispersion relation |
| $S_l(k_x, k_y, z)\vert_{z=max(h_l(x,y))}^{z=min(h_{l+1}(x,y))} = NDFT_z^{-1}\{R_l(k_x, k_y, \overline{k_{z_l}}[(\bar{f}))\}$ | (5) Intermediate image spectrum valid for range along z for layer l |
| $s_l(x, y, z)\vert_{z=max(h_l(x,y))}^{z=min(h_{l+1}(x,y))} = FFT_{XY}^{-1}\{S_l(k_x, k_y, z)\vert_{z=max(h_l(x,y))}^{z=min(h_{l+1}(x,y))}\}$ | (6) Compute image l |
| if $l = L - 1$, then break | (7) Terminate loop if last layer, otherwise prepare for next iteration |
| $V_l(k_x, k_y, z, \bar{f})\Big\vert_{z=max(h_{l+1}(xy))}^{z=min(h_{l+1}(x,y))} = R_l(k_x, k_y, \overline{k_{z}}_l(f)) \cdot \exp\left(-j(z-z_l)\sqrt{\overline{k_{z}}_l^2(\bar{f}) - k_x^2 - k_y^2}\right)$ | (8) Intermediate image spectrum valid for range z along $h_{l+1}$ (x, y) for each frequency |
| $v_l(x, y, z, \bar{f})_{z=max(h_{l+1}(x,y))}^{z=min(h_{l+1}(x,y))} = FFT_{XY}^{-1}\{V_l(k_x, k_y, z, \bar{f})\vert_{z=max(h_{l+1}(x,y))}^{z=min(h_{l+1}(x,y))}\}$ | (9) Intermediate image valid for range z along $h_{l+1}$ (x, y) separated by frequency |
| $\bar{x}_n, \bar{y}_n \leftarrow x,y$ | (10) Reinterpret uniform x and y as nonuniform |
| $\bar{z}_n = h_{l+1}(\bar{x}_n, \bar{y}_n)$ | (11) Compute nonuniform z |
| $q_n(\bar{x}_n, \bar{y}_n, \bar{z}_n, \bar{f})\forall n = v_l(\bar{x}_n, \bar{y}_n, \bar{z}_n, \bar{f})$ | (12) Sample intermediate image to extract data translated to next interface |
| $R_{l+1}(k_x, k_y, \bar{f}) = SD_{XYZ}\{q_n(\bar{x}_n, \bar{y}_n, \bar{z}_n, \bar{f})\forall n, c_{l+1}\}$ | (13) Compute spectrum for next interface using phase velocity $c_{l+1}$ |
| $s(x, y, z) = Merge\{s_l(x, y, z)\forall l\}$ | (14) Appropriately merge images to final volume image |

Figure 9:
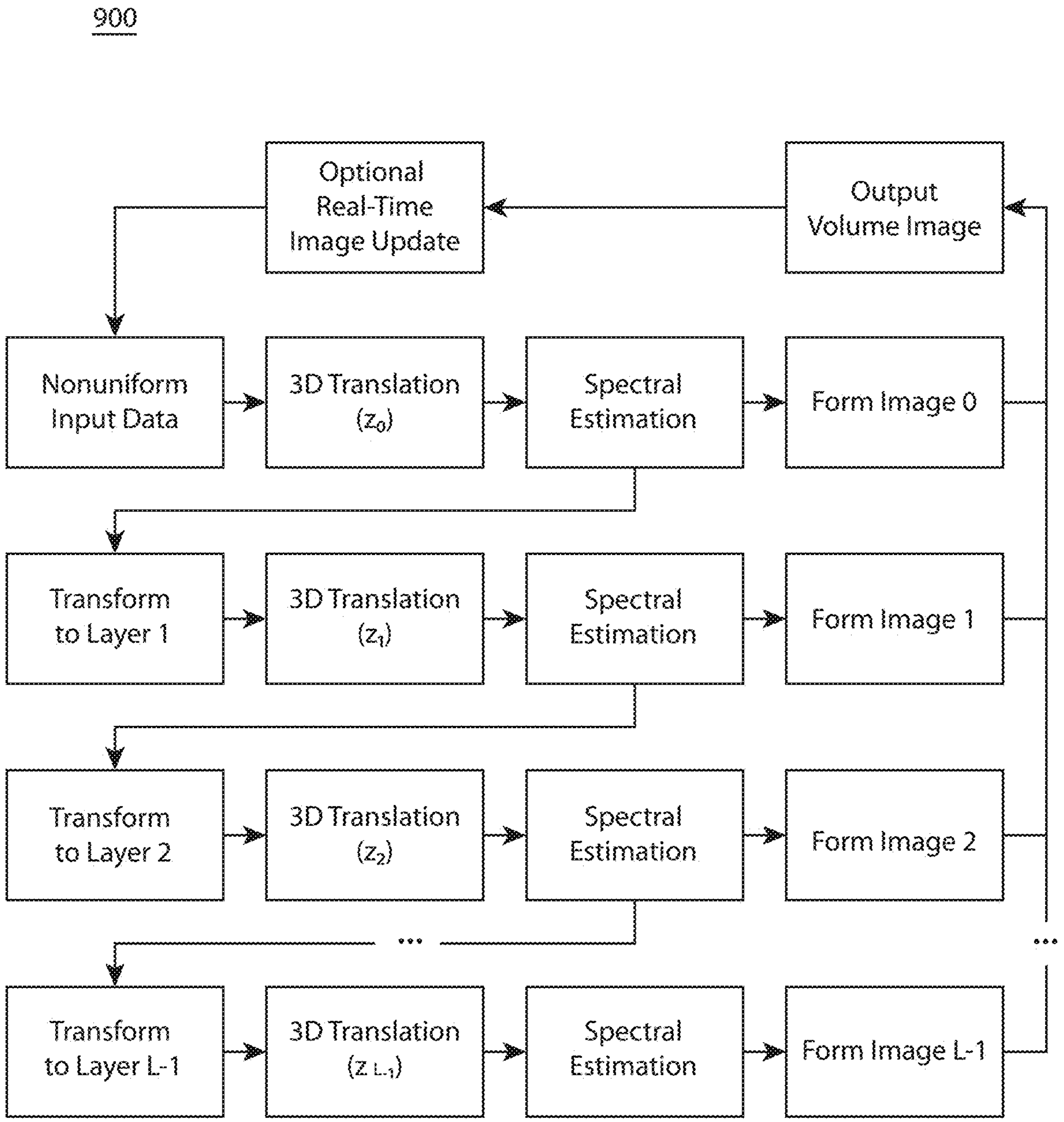
FIG. 9 is a flow diagram illustrating SAFT from 3D nonuniform measurements and curved interfaces, according to an embodiment of the present invention.
Figure 10:
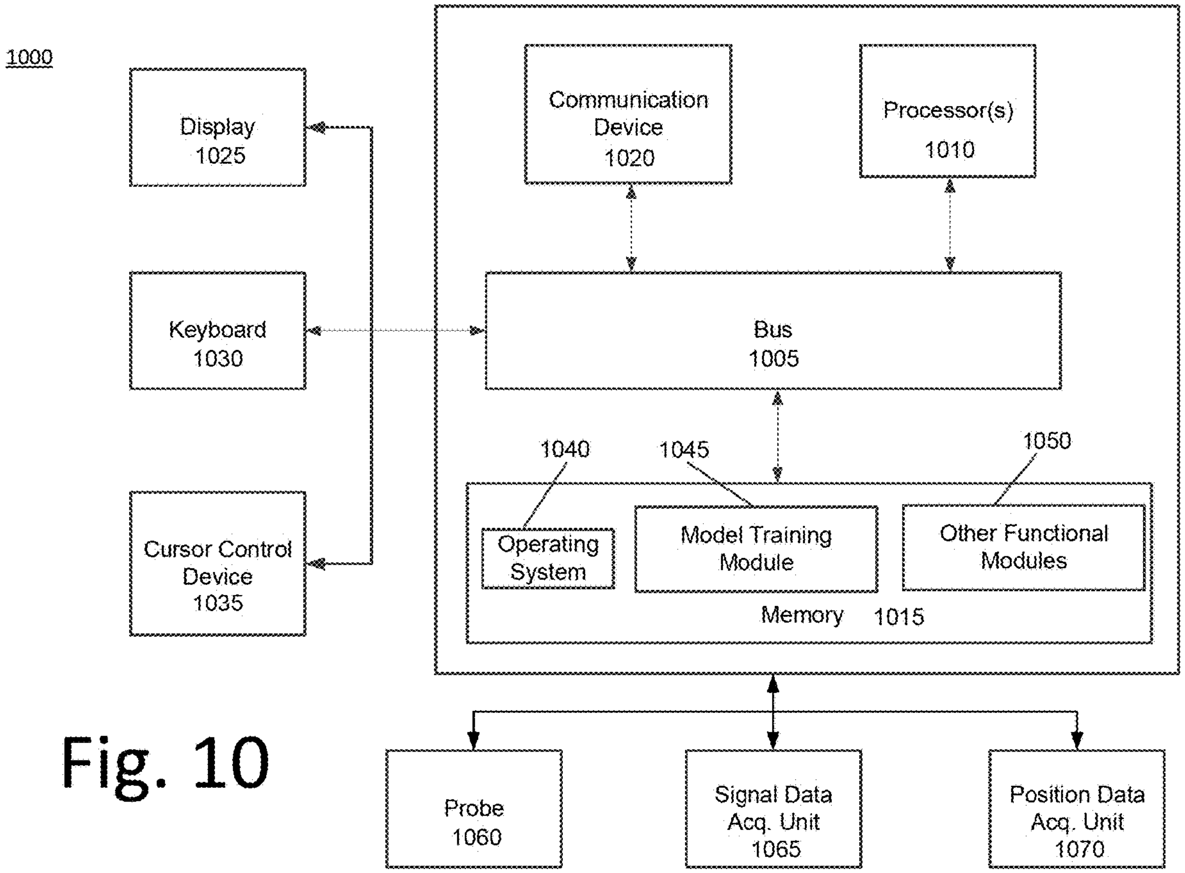
FIG. 10 is an architectural diagram illustrating a computing system configured to perform freehand scan imaging, according to an embodiment of the present invention.

See, for example, FIG. 9. FIG. 9 is a flow diagram 900 illustrating SAFT from 3D nonuniform measurements and curved interfaces. The image of Layer 0 (between the measurements and the top interface of Layer 1) is formed identically to before and is hereafter referred to as Image 0, which is valid for $z>h_1(x, y)$. However, the spectral estimation used to form Image 0 is also translated to the top of interface of Layer 1. See Algorithm 4, Lines 8-12. The process is similar to SAFT except that the information across frequency is preserved instead of summed as shown by the intermediate image spectrum for each frequency $v_l(k_x, k_y, z, \bar{f})$ and the intermediate image for each frequency $v_l(x, y, z, \bar{f})$ for layer l. The intermediate image is then resampled in space $(\bar{x}_n, \bar{y}_n, \bar{z}_n)\forall n$ to produce the data translated to the interface of the next layer $q_n(\bar{x}_n, \bar{y}_n, \bar{z}_n, \bar{f})\forall n$, where $q_n$ is a FIG. 10 is an architectural diagram illustrating a computing system 1000 configured to perform freehand scan imaging, according to an embodiment of the present invention. In some embodiments, computing system 1000 may be one or more of the computing systems depicted and/or described herein. Computing system 1000 includes a bus 1005 or other communication mechanism for communicating information, and processor(s) 1010 coupled to bus 1005 for processing information. Processor(s) 1010 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1010 may also have multiple processing cores, and at least some of the cores may be configured to perform specific functions. Multi-parallel processing may be used in some embodiments. In certain embodiments, at least one of processor(s) 1010 may be a neuromorphic circuit that includes processing elements that mimic biological neurons. In some embodiments, neuromorphic circuits may not require the typical components of a Von Neumann computing architecture.

Computing system 1000 further includes a memory 1015 for storing information and instructions to be executed by processor(s) 1010. Memory 1015 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1010 and may include volatile media, non-volatile media, or both. The media may also be removable, non-removable, or both.

Additionally, computing system 1000 includes a communication device 1020, such as a transceiver, to provide access to a communications network via a wireless and/or wired connection. In some embodiments, communication device 1020 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1020 may include one or more antennas that are singular, arrayed, phased, switched, beamforming, beamsteering, a combination thereof, and or any other antenna configuration without deviating from the scope of the invention.

Processor(s) 1010 are further coupled via bus 1005 to a display 1025, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1025 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1030 and a cursor control device 1035, such as a computer mouse, a touchpad, etc., are further coupled to bus 1005 to enable a user to interface with computing system. However, in certain embodiments, a physical keyboard and mouse may not be present, and the user may interact with the device solely through display 1025 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1015 stores software modules that provide functionality when executed by processor(s) 1010. The modules include an operating system 1040 for computing system 1000. The modules further include a freehand scanning imaging module 1045 that is configured to perform all or part of the processes described herein or derivatives thereof. Computing system 1000 may include one or more additional functional modules 1050 that include additional functionality.

Figure 11:
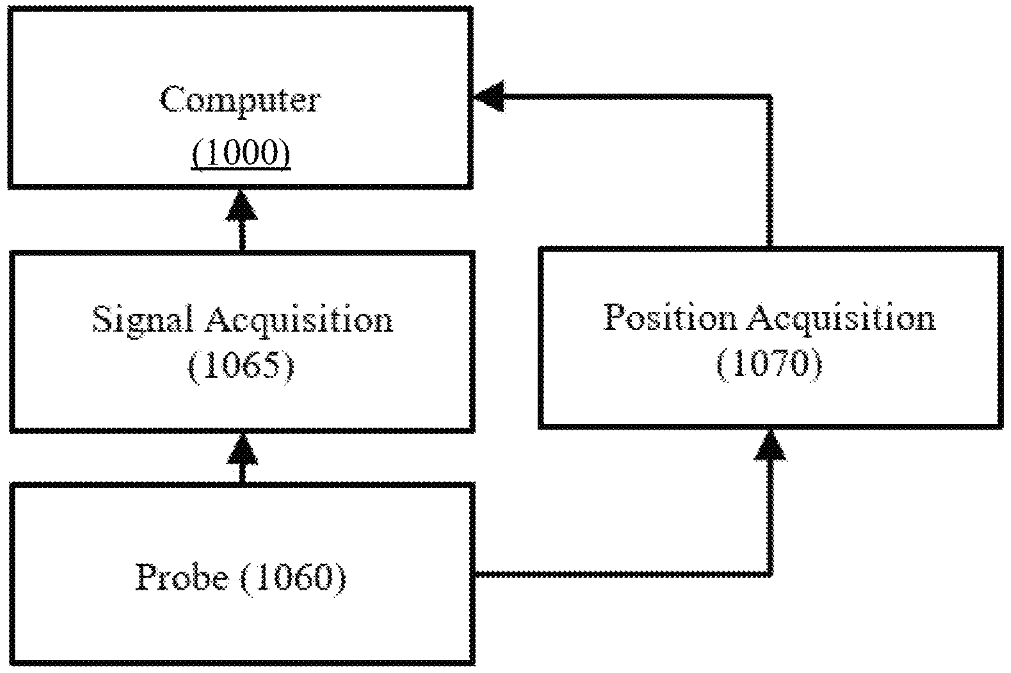
FIG. 11 is a diagram illustrating a system for collecting information and performing an algorithm for freehand scan imaging, according to an embodiment of the present invention.

In some embodiments, probe 1060, signal data acquisition unit 1065 and position data acquisition unit 1070 is connected to computing system 1000. See, for example, FIG. 11, which is a diagram illustrating system 1100 for collecting information and performing an algorithm for freehand scan imaging, according to an embodiment of the present invention. Probe 1060 may be an ultrasonic transducer or microwave probe that generates a probe signal. The probe signal, typically a voltage, is acquired by signal data acquisition unit 1065. In some embodiments, signal data acquisition unit 106 may be a pulser-receiver, oscilloscope, phased array system, vector network analyzer, miniature radar, or some device that measures an ultrasonic signal or microwave signal. The position of the probe is tracked and relevant position information is acquired by position data acquisition unit 1070. In some embodiments, position data acquisition unit 1070 may be string encoders, laser positioning system, visual positioning system, robotic system, or some system that measures the position of the probe. The information is collected in computing system 1000, which performs the algorithms as described and stores and displays data.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 12:
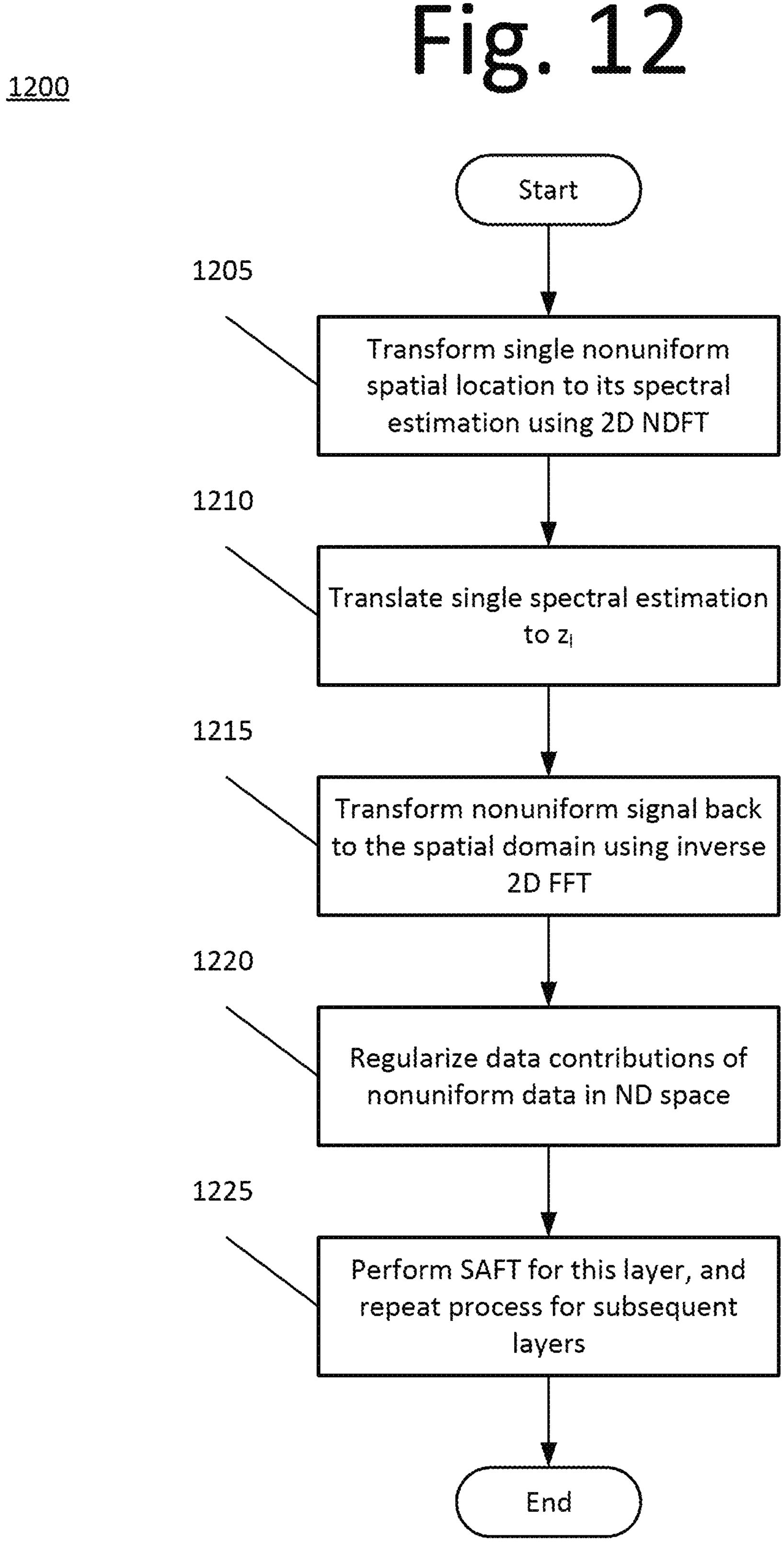
FIG. 12 is a flow diagram illustrating a method for performing freehand scanning imaging, according to an embodiment of the present invention.

FIG. 12 is a flow diagram illustrating method 1200 for performing freehand scanning imaging, according to an embodiment of the present invention. In some embodiments, method 1200 begins at 1205 with transforming single non-uniform spatial location to its spectral estimation using 2D NDFT. In some embodiments, this may include transforming, by at least one processor, a single spatial location with nonuniform input data using NDFT for one spatial location to a singular spectral estimation. At 1210, method 1200 includes translating single spectral estimation to $z_l$. In some embodiments, this may include translating, by the at least one processor, the singular spectral estimation to $z_l$, where $z_l$ is a common value of z for which to later recombine data for layer l, where l begins at zero. At 1215, method 1200 include transforming nonuniform signal back to the spatial domain using inverse 2D FFT. In some embodiments, this may include performing, by the at least one processor, Inverse Spatial Fourier Transform on the translated spectrum to produce a translated data in a x- and y-spatial domain at $z=z_l$. At 1220, method 1200 includes regularizing data contributions of nonuniform data in ND space. This may include outputting, by the at least one processor, three dimension (3D) translated data to an N-dimensional regularization from all measured locations, where all measured locations are regularized data resulting from a combined sum of all measured contributions. At 1225, method 1200 includes performing SAFT for this layer, and repeat process for subsequent layers. In some embodiments, this may include outputting, by the at least one processor, the regularized data to a SAFT algorithm to produce images layer-by-layer, whereby the process is repeated, by the at least one processor, for subsequent layers layer-by-layer.

The process steps performed in 5, 6, 9 and 12 may be performed by a computer program, encoding instructions for the processor(s) to perform at least part of the process(es) described in 5, 6, 9 and 12, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in 5, 6, 9 and 12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for performing freehand scanning imaging, comprising:

transforming, by at least one processor, a single spatial location with nonuniform input data using Nonuniform Discrete Fourier Transform (NDFT) for one spatial location to a singular spectral estimation, wherein the single spatial location is a component of a curved surface with nonuniform roll, pitch, and yaw or a point cloud with nonuniform roll, pitch, and yaw;

translating, by the at least one processor, the singular spectral estimation to $z_l$, wherein $z_l$ is a common value of z for which to later recombine data for layer l, where l begins at zero;

performing, by the at least one processor, Inverse Spatial Fourier Transform on the translated spectrum to produce a translated data in a x- and y-spatial domain at $z=z_l$;

outputting, by the at least one processor, three dimension (3D) translated data to an N-dimensional regularization from all measured locations, where all measured locations are regularized data resulting from a combined sum of all measured contributions; and outputting, by the at least one processor, the regularized data to a synthetic aperture focusing technique (SAFT) algorithm to produce images layer-by-layer, whereby the process is repeated, by the at least one processor, for subsequent layers layer-by-layer, wherein boundaries for each layer are curved surfaces.

2. The method of claim 1, wherein the nonuniform input data is defined as $d_n(\bar{x}_n, \bar{y}_n, \bar{z}_n, \bar{f})$, where $d_n(\bar{x}_n, \bar{y}_n, \bar{z}_n, \bar{f})$ is a coherent, complex-valued 1D signal array for sample index n for 3D nonuniform measurements, and the number of elements equals a number of elements of $\bar{f}$, $\bar{f}$ is a 1d array of uniformly or nonuniformly sampled frequency.

3. The method of claim 1, wherein the singular spectral estimation is defined as $D_n(k_x, k_y, \bar{z}_n, \bar{f})$, where $D_n(k_x, k_y, \bar{z}_n, \bar{f})$ is a 3D array storing the spectrum of $d_n(\bar{x}_n, \bar{y}_n, \bar{z}_n, \bar{f})$ for sample index n, $k_x$ is a 1D array of uniformly sampled spatial frequency along x, $k_y$ is a 1D array of uniformly sampled spatial frequency along y, and $\bar{f}$ is a 1d array of uniformly or nonuniformly sampled frequency.

4. The method of claim 1, further comprising:

translating the singular spectral estimation to $z_l$ using $$T_n(k_x, k_y, \bar{z}_n, \bar{f}) = D_n(k_x, k_y, \bar{z}_n, \bar{f})\exp\left(-j(z_l - \bar{z}_n)\sqrt{\bar{k}_{zl}^2(\bar{f}) - k_x^2 - k_y^2}\right)$$

where $T_n$ is the translated data in the spectral frequency domain at $z=z_l$, and transforming back into the spatial domain, prior to regularization, $D_n(k_x, k_y, \bar{z}_n, \bar{f})$ is a 3D array storing the spectrum of $d_n(\bar{x}_n, \bar{y}_n, \bar{z}_n, \bar{f})$ for sample index n, $k_x$ is a 1D array of uniformly sampled spatial frequency along x, $k_y$ is a 1D array of uniformly sampled spatial frequency along y, $\bar{k}_{z_l}$ is 1D array of nonuniformly sampled spatial frequency along z related to frequency by the dispersion relation, and $\bar{f}$ is a 1d array of uniformly or nonuniformly sampled frequency.

5. The method of claim 1, further comprising:

regularizing the translated data, by the at least one processor, in N-dimensional space by tracking the aggregated data using $$a(x, y, z, \bar{f}) \mathrel{+}= t_n(x, y, \bar{z}_n, \bar{f}) \cdot b(x - \bar{x}_n, y - \bar{y}_n, z - \bar{z}_n)$$

and its aggregated weight using $$w(x, y, z) \mathrel{+}= b(x - \bar{x}_n, y - \bar{y}_n, z - \bar{z}_n)$$

whereby for regularization of data for layer l using $$r_l(x, y, \bar{f}) = \begin{cases} \sum_z a(x, y, z, \bar{f})/w(x, y, z) & \sum_z w(x, y, z) > tol \\ 0 & \text{otherwise} \end{cases},$$

where b is a function representing a brush, $\bar{f}$ is a 1d array of uniformly or nonuniformly sampled frequency, and tol is representative of tolerance.

6. The method of claim 1, further comprising:

performing, by at least one processor, spectral estimation of the regularized data for layer l using $$R_l(k_x, k_y, \bar{f}) = FFT_{XY}\{r_l(x, y, \bar{f})\}.$$

$k_x$ is a 1D array of uniformly sampled spatial frequency along x, $k_y$ is a 1D array of uniformly sampled spatial frequency along y, and $\bar{f}$ is a 1d array of uniformly or nonuniformly sampled frequency.

7. The method of claim 1, further comprising:

performing, by the at least one processor, piecewise image formation in laminar materials by performing the same translation, regularization, and image formation process for each subsequent layer.

8. The method of claim 1, wherein the regularized data is a sum of a translated partial data.

9. A non-transitory computer-readable medium comprising a computer program for performing freehand scanning imaging, wherein the computer program is configured to cause at least one processor to execute:

transforming a single spatial location with nonuniform input data using Nonuniform Discrete Fourier Transform (NDFT) for one spatial location to a singular spectral estimation, wherein the single spatial location is a component of a curved surface with nonuniform roll, pitch, and yaw or a point cloud with nonuniform roll, pitch, and yaw;

translating the singular spectral estimation to $z_l$, wherein $z_l$ is a common value of z for which to later recombine data for layer l, where l begins at zero;

performing Inverse Spatial Fourier Transform on the translated spectrum to produce a translated data in a x- and y-spatial domain at $z=z_l$;

outputting three dimension (3D) translated data to an N-dimensional regularization from all measured locations, where all measured locations are regularized data resulting from a combined sum of all measured contributions; and outputting the regularized data to a synthetic aperture focusing technique (SAFT) algorithm to produce images layer-by-layer, whereby the process is repeated, by the at least one processor, for subsequent layers layer-by-layer, wherein boundaries for each layer are curved surfaces.

10. The non-transitory computer-readable medium of claim 9, wherein the nonuniform input data is defined as $d_n(\overline{x}_n, \overline{y}_n, \overline{z}_n, \overline{f})$, where $d_n(\overline{x}_n, \overline{y}_n, \overline{z}_n, \overline{f})$ is a coherent, complex-valued 1D signal array for sample index n for 3D nonuniform measurements, and the number of elements equals a number of elements of $\overline{f}$, $\overline{f}$ is a 1d array of uniformly or nonuniformly sampled frequency.

11. The of claim 9, wherein the singular spectral estimation is defined as $D_n(k_x, k_y, \overline{z}_n, \overline{f})$, where $D_n(k_x, k_y, \overline{z}_n, \overline{f})$ is a 3D array storing the spectrum of $d_n(\overline{x}_n, \overline{y}_n, \overline{z}_n, \overline{f})$ for sample index n, $k_x$ is a 1D array of uniformly sampled spatial frequency along x, $k_y$ is a 1D array of uniformly sampled spatial frequency along y, and $\overline{f}$ is a 1d array of uniformly or nonuniformly sampled frequency.

12. The non-transitory computer-readable medium of claim 9, wherein the computer program is configured to cause at least one processor to execute:

translating the singular spectral estimation to $z_l$ using $$T_n(k_x, k_y, \overline{z}_n, \overline{f}) = D_n(k_x, k_y, \overline{z}_n, \overline{f})\exp\left(-j(z_l - \overline{z}_n)\sqrt{\overline{k}_{zl}^2(\overline{f}) - k_x^2 - k_y^2}\right)$$

where $T_n$ is the translated data in the spectral frequency domain at $z=z_l$, and transforming back into the spatial domain, prior to regularization, $D_n(k_x, k_y, \overline{z}_n, \overline{f})$ is a 3D array storing the spectrum of $d_n(\overline{x}_n, \overline{y}_n, \overline{z}_n, \overline{f})$ for sample index n, $k_x$ is a 1D array of uniformly sampled spatial frequency along x, $k_y$ is a 1D array of uniformly sampled spatial frequency along y, $\overline{k}_{zl}$ is 1D array of nonuniformly sampled spatial frequency along z related to frequency by the dispersion relation, and $\overline{f}$ is a 1d array of uniformly or nonuniformly sampled frequency.

13. The non-transitory computer-readable medium of claim 9, wherein the computer program is configured to cause at least one processor to execute:

regularizing the translated data in N-dimensional space by tracking the aggregated data using $$a(x, y, z, \overline{f}) += t_n(x, y, \overline{z}_n, \overline{f}) \cdot b(x - \overline{x}_n, y - \overline{y}_n, z - \overline{z}_n)$$

and its aggregated weight using $$w(x, y, z) += b(x - \overline{x}_n, y - \overline{y}_n, z - \overline{z}_n)$$

whereby for regularization of data for layer l using $$r_l(x, y, \overline{f}) = \begin{cases} \sum_z a(x, y, z, \overline{f})/w(x, y, z) & \sum_z w(x, y, z) > tol \\ 0 & \text{otherwise} \end{cases},$$

where b is a function representing a brush, $\overline{f}$ is a 1d array of uniformly or nonuniformly sampled frequency, and tol is representative of tolerance.

14. The non-transitory computer-readable medium of claim 9, wherein the computer program is configured to cause at least one processor to execute:

performing spectral estimation of the regularized data for layer l using $$R_l(k_x, k_y, \overline{f}) = FFT_{XY}\{r_l(x, y, \overline{f})\},$$

where $k_x$ is a 1D array of uniformly sampled spatial frequency along x, $k_y$ is a 1D array of uniformly sampled spatial frequency along y, and $\overline{f}$ is a 1d array of uniformly or nonuniformly sampled frequency.

15. The non-transitory computer-readable medium of claim 9, wherein the computer program is configured to cause at least one processor to execute:

performing piecewise image formation in laminar materials by performing the same translation, regularization, and image formation process for each subsequent layer.

16. The non-transitory computer-readable medium of claim 9, wherein the regularized data is a sum of a translated partial data.

17. A system for performing freehand scanning imaging, comprising:

memory comprising a set of instructions; and at least one processor, wherein the set of instructions is configured to cause at least one processor to execute:

transforming a single spatial location with nonuniform input data using Nonuniform Discrete Fourier Transform (NDFT) for one spatial location to a singular spectral estimation, wherein the single spatial location is a component of a curved surface with nonuniform roll, pitch, and yaw or a point cloud with nonuniform roll, pitch, and yaw;

translating the singular spectral estimation to $z_l$, wherein $z_l$ is a common value of z for which to later recombine data for layer l, where l begins at zero;

performing Inverse Spatial Fourier Transform on the translated spectrum to produce a translated data in a x- and y-spatial domain at $z=z_l$;

outputting three dimension (3D) translated data to an N-dimensional regularization from all measured locations, where all measured locations are regularized data resulting from a combined sum of all measured contributions; and outputting the regularized data to a synthetic aperture focusing technique (SAFT) algorithm to produce images layer-by-layer, whereby the process is repeated, by the at least one processor, for subsequent layers layer-by-layer, wherein boundaries for each layer are curved surfaces.

18. The system of claim 17, wherein the nonuniform input data is defined as $d_n(\bar{x}_n, \bar{y}_n, \bar{z}_n, \bar{f})$, where $d_n(\bar{x}_n, \bar{y}_n, \bar{z}_n, \bar{f})$ is a coherent, complex-valued 1D signal array for sample index n for 3D nonuniform measurements, and the number of elements equals a number of elements of $\bar{f}$, $\bar{f}$ is a 1d array of uniformly or nonuniformly sampled frequency.

19. The system of claim 17, wherein the singular spectral estimation is defined as $D_n(k_x, k_y, \bar{z}_n, \bar{f})$, where $D_n(k_x, k_y, \bar{z}_n, \bar{f})$ is a 3D array storing the spectrum of $d_n(\bar{x}_n, \bar{y}_n, \bar{z}_n, \bar{f})$ for sample index n, $k_x$ is a 1D array of uniformly sampled spatial frequency along x, $k_y$ is a 1D array of uniformly sampled spatial frequency along y, and $\bar{f}$ is a 1d array of uniformly or nonuniformly sampled frequency.

20. The system of claim 17, wherein the set of instructions is configured to cause at least one processor to execute:

translating the singular spectral estimation to $z_l$ using $$T_n(k_x, k_y, \bar{z}_n, \bar{f}) = D_n(k_x, k_y, \bar{z}_n, \bar{f})\exp\left(-j(z_l - \bar{z}_n)\sqrt{\bar{k}_{zl}^2(\bar{f}) - k_x^2 - k_y^2}\right)$$

where $T_n$ is the translated data in the spectral frequency domain at $z=z_l$, and transforming back into the spatial domain, prior to regularization, $D_n(k_x, k_y, \bar{z}_n, \bar{f})$ is a 3D array storing the spectrum of $d_n(\bar{x}_n, \bar{y}_n, \bar{z}_n, \bar{f})$ for sample index n, $k_x$ is a 1D array of uniformly sampled spatial frequency along x, $k_y$ is a 1D array of uniformly sampled spatial frequency along y, $\bar{k}_{z_l}$ is 1D array of nonuniformly sampled spatial frequency along z related to frequency by the dispersion relation, and $\bar{f}$ is a 1d array of uniformly or nonuniformly sampled frequency.

21. The system of claim 17, wherein the set of instructions is configured to cause at least one processor to execute:

regularizing the translated data in N-dimensional space by tracking the aggregated data using $$a(x, y, z, \bar{f}) += t_n(x, y, \bar{z}_n, \bar{f}) \cdot b(x - \bar{x}_n, y - \bar{y}_n, z - \bar{z}_n)$$

and its aggregated weight using $$w(x, y, z) += b(x - \bar{x}_n, y - \bar{y}_n, z - \bar{z}_n)$$

whereby for regularization of data for layer l using $$r_l(x, y, \bar{f}) = \begin{cases} \sum_z a(x, y, z, \bar{f})/w(x, y, z) & \sum_z w(x, y, z) > tol \\ 0 & \text{otherwise} \end{cases},$$

where where b is a function representing a brush, $\bar{f}$ is a 1d array of uniformly or nonuniformly sampled frequency, and tol is representative of tolerance.

22. The system of claim 17, wherein the set of instructions is configured to cause at least one processor to execute:

performing spectral estimation of the regularized data for layer l using $$R_l(k_x, k_y, \bar{f}) = FFT_{XY}\{r_l(x, y, \bar{f})\},$$

where $k_x$ is a 1D array of uniformly sampled spatial frequency along x, $k_y$ is a 1D array of uniformly sampled spatial frequency along y, and $\bar{f}$ is a 1d array of uniformly or nonuniformly sampled frequency.

23. The system of claim 17, the set of instructions is configured to cause at least one processor to execute:

performing piecewise image formation in laminar materials by performing the same translation, regularization, and image formation process for each subsequent layer.

24. The system of claim 17, wherein the regularized data is a sum of a translated partial data.

* * * * *